(12) United States Patent
Clarke

(10) Patent No.: US 6,764,733 B1
(45) Date of Patent: Jul. 20, 2004

(54) HOT BITUMEN COMPATIBLE EPDM ROOFING SHEET

(75) Inventor: Steven R. Clarke, Mount Holly Springs, PA (US)

(73) Assignee: Carlisle Management Company, Syracuse, NY (US)

(*) Notice: Subject to any disclaimer, the term of this patent is extended or adjusted under 35 U.S.C. 154(b) by 0 days.

(21) Appl. No.: 09/238,678

(22) Filed: Jan. 26, 1999

(51) Int. Cl.[7] .............................................. B32B 33/00
(52) U.S. Cl. .................... 428/40.3; 52/90.2; 52/91.1; 52/749.12; 428/43; 428/44; 428/45; 428/46; 428/47; 428/48; 428/49; 428/50; 428/51; 428/52; 428/53; 428/54; 428/55; 428/56; 428/57; 428/58; 428/286; 428/287; 428/288; 428/289; 428/290; 428/291; 428/292; 428/293; 428/394; 428/395; 428/396; 428/397; 428/398; 428/399; 442/43; 442/45; 442/48; 442/58; 442/286; 442/287; 442/288; 442/289; 442/290; 442/291; 442/292; 442/293; 442/394; 442/395; 442/396; 442/397; 442/398; 442/399
(58) Field of Search ................. 52/90.2, 91.1, 52/749.12; 428/36.1, 36.2, 36.91, 40.3, 54–56, 71, 74, 141, 142, 144, 147, 295.1, 297.1, 343, 346, 384, 489; 442/43, 45, 48, 58, 65, 67, 149, 150, 164, 170, 171, 180, 284, 288, 290, 293, 298, 299, 300, 320, 326, 394, 396, 397, 399

(56) References Cited

U.S. PATENT DOCUMENTS

| | | | |
|---|---|---|---|
| 4,087,296 A | 5/1978 | Hooker | 156/71 |
| 4,248,926 A | 2/1981 | Tajima et al. | 428/253 |
| 4,636,414 A * | 1/1987 | Tajima et al. | 428/40.3 |
| 4,755,409 A * | 7/1988 | Harkness | 428/40.3 |
| 4,948,652 A * | 8/1990 | Kelleher et al. | 428/110 |
| 4,996,812 A * | 3/1991 | Venable | 52/408 |
| 5,620,554 A | 4/1997 | Venable | 156/496 |
| 5,955,188 A * | 9/1999 | Pushaw | 428/320.2 |
| 6,110,846 A * | 8/2000 | Brzozowski et al. | 442/258 |
| 6,305,143 B1 * | 10/2001 | Streets et al. | 52/746.11 |
| 6,360,511 B1 * | 3/2002 | Brzozowski et al. | 52/408 |
| 6,502,360 B2 * | 1/2003 | Carr et al. | 52/408 |

FOREIGN PATENT DOCUMENTS

| | | | |
|---|---|---|---|
| DE | 3042943 A1 | 7/1982 | |
| FR | 2554151 | * 10/1993 | E04D/11/02 |
| WO | WO82-01684 | 5/1982 | |

OTHER PUBLICATIONS

Merrian Webster's definitons of "Bitumin and Asphalt".*

* cited by examiner

Primary Examiner—Arti Singh
(74) Attorney, Agent, or Firm—Wood, Herron & Evans, L.L.P.

(57) ABSTRACT

A roof membrane and a roof system employing a EPDM membrance which is compatible with a bituminous adhesive. The membrane includes an outer layer of polymeric layer such as EPDM bonded to a polyester protective layer which is in turn bonded to a fleecy material. This can be adhered to a roof deck surface using hot asphalt or bitumen which bonds the fleecy material to the roof deck in turn holding the EPDM in place. The polyester layer prevents the asphaltic material from attacking and dissolving the EPDM with the fleecy material providing good adhesion between the polyester and the EPDM.

11 Claims, 1 Drawing Sheet

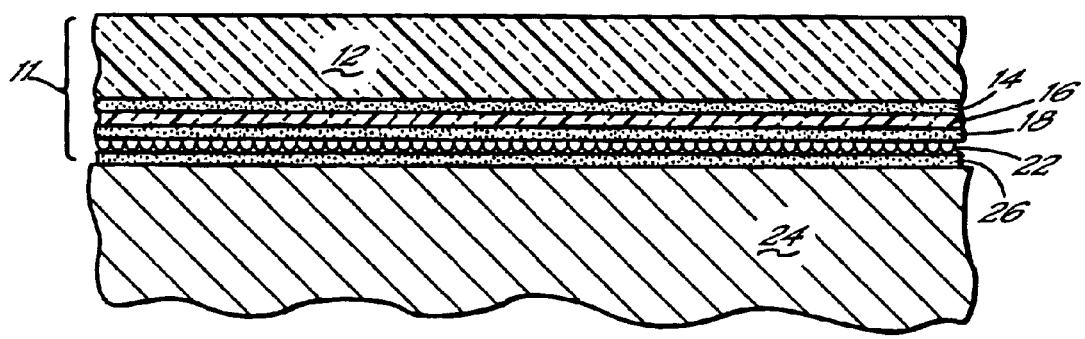

HOT BITUMEN COMPATIBLE EPDM ROOFING SHEET

BACKGROUND

Roof systems are made from a variety of different materials. Historically the traditional roof system for larger buildings was formed from hot bitumen. The bitumen basically is applied to the roof deck as a molten material. A layer of roofing felt is applied over the molten bitumen. This is repeated so that there are multiple layers of bitumen and multiple layers of felt. This is commonly referred to as a built-up roof.

In the very early 1970's, single ply roofing systems were invented. These generally included a single ply of a polymeric material which was somehow fastened to a roof system. By far the most successful single ply polymeric material was ethylene propylene diene monomer rubber or EPDM. A similar material ethylene propylene monomer rubber is also employed. These systems are sensitive to some organic solvents.

Bitumens are complex mixtures of organic compounds, some of which are of such a nature as to act as a solvent or plasticizer for polymeric materials such as EPDM. Even in cases where no physical damage is evident, these materials can migrate through materials such as plasticized PVC and cause staining on the exposed surfaces.

Due to the sensitivity of these materials, they generally are not suitable for use in combination with a bituminous adhesive. Felt-backed EPDMs have been utilized and applied with a bituminous adhesive. However, in the long run they are not successful. The fleece-backed material provides a physical bonding to the bituminous adhesive overcoming the incompatibility of the EPDM to the bituminous adhesive. However, frequently the bituminous adhesive would pool up and could actually soak through the fleece-backed material, swelling and discoloring a the EPDM. As a result, the fleece-backed material is now generally applied using a polymeric adhesive such as a foam polyurethane as disclosed in Venable U.S. Pat. No. 4,996,812. One such fleece-back EPDM is disclosed in Venable U.S. Pat. No. 5,620,554. This utilizes a polyolefin adhesive layer i.e., polyethylene to bond the fleece material to the EPDM. Polyolefins are themselves sensitive to the same organic solvents as EPOM and therefore are unsuitable for use in contact with bituminous adhesives.

Many roofers are much more familiar with the bituminous adhesive than the polyurethane adhesive and therefore are hesitant to utilize the polyurethane adhesive. Further application of polyurethane adhesives requires an investment in equipment for efficient application. Roofers who have already invested capital for equipment to apply bituminous adhesives are reluctant to invest in the newer technology.

SUMMARY OF THE INVENTION

Accordingly it is the object of the present invention to provide a single ply EPDM roof membrane which can be adhered to a roof deck utilizing a bituminous adhesive.

The present invention is premised on the realization that an EPDM membrane which incorporates both a fleecy material with a protective barrier layer between the fleecy material and the EPDM can be adhered to a roof deck utilizing a bituminous adhesive. The barrier sheet in effect protects the EPDM sheeting from the bituminous adhesive and the fleece-back material provides the physical adhesion bonding the EPDM to the roof deck with the bituminous adhesive. The objects and advantages of the present invention will be further appreciated in light of the following detailed description and drawings in which:

BRIEF DESCRIPTION OF THE FIGURE

The FIGURE is a cross-sectional diagramatic view of the present invention.

DETAILED DESCRIPTION

According to the present invention, a roof membrane 11 is bonded to a roof deck 24 by a bituminous adhesive 26. More particularly the membrane 11 includes an upper polymeric roofing layer layer 12, a barrier layer 16, and a fleece layer 22. The polymeric layer can be EPDM or thermoplastic olefin (TPO), polyvinyl chloride (PVC), chlorosulfonated polyethylene (CSPE) or ethylene propylene monomer rubber (EPM) and alloys of there polymers.

The roofing layer 12 can be purchased from a variety of sources and is a well-known commodity. Any EPDM roof membrane can be utilized in the present invention. The roof membrane must be a clean sheet. In other words, all talc must be removed. A method of removing talc from EPDM is disclosed in Venable U.S. Pat. No. 5,620,554 the disclosure of which is incorporated herein by reference. PVC and TPO sheeting is usually manufactured clean. Generally for roofing applications the roofing layer 12 will be from about 40 to about 150 mills thick with 40–70 mills preferred. However, this is merely a matter of choice.

The barrier layer is a polymeric layer 16 which is either thermoset or high temperature thermoplastic and resistant to bituminous material. By high temperature it is meant that it will not melt at the application temperature of the hot asphalt which is generally about 350° F. Suitable materials include generally polar polymers such as polyesters, polyurethane, polyether-urethanes and the like. Preferred materials are polyethylene terephthalate (Mylar), and polybutylene terephthalate. This layer should be as thin as possible as can be from about 0.00025 to about 0.015 inches in thickness. Although a thicker material can be utilized, it would merely add weight and provide no added benefit.

The barrier layer 16 is bonded to the roofing layer 12 by an adhesive layer 14. This must be an adhesive that is compatible with both the roofing layer 12 and the barrier layer. Generally a copolymer or a polyurethane adhesive can be utilized for EPDM. When a hot melt is used, it can be applied as a molten liquid or as a thin sheet of adhesive which is melted during formation of the sheet 11 as described below. The adhesive may be purchased already coated on the barrier layer. One commercially available adhesive/barrier composite which is particularly suitable is TRANS-KOTE KRTY sold by Transilwrap Company, Inc.

The adhesive layer 14 is preferably the same as an adhesive layer 18 which bonds the barrier layer 16 to a fleecy material 22.

Fleecy material 22 is a fibrous material either woven or non-woven. Likewise, it should not melt at the application temperature of the hot asphalt. It can be formed from a variety of materials including polypropylene, nylon, glass, and polyester which is preferred. One such commercially available fleecy material is TREVIRA sold by John Manville Hoechst Celanese.

The sheeting material can be formed utilizing the equipment as disclosed in Venable U.S. Pat. No. 5,620,554. Basically the roofing layer 12 is unwound, heated and layers of adhesive, barrier layer adhesive (optionally as an adhesive/barrier layer/adhesive composite) and fleece 22 are laid on top of each other and passed between rollers to cause the adhesive layers 14 and 18 to melt bonding the EPDM 12 to the barrier layer 16 and the barrier layer 16 to the fleece material 22.

Roof membrane 11 can also be formed by extruding hot melt adhesives between the respective layer and running the composite roofing layer barrier layer and fleece between compression rollers.

Although not shown, it may be preferable for the fleece material to have a width slightly less than the width of the roofing layer so as to provide a 2 to 4 inch selvedge edge wherein no fleece material is present as disclosed in Venable U.S. Pat. No. 5,620,554. This permits better adhesion for lap seams.

The roofing material 11 itself is applied to a roof deck by using bitumen i.e., asphaltic adhesive. This can be applied as a molten material. The material is heated until molten simply mopped, sprayed or poured onto the roof deck 24. The roofing material 11 is applied to the hot bituminous material prior to its solidification. Alternatively the bitumen can be supplied in a mastic form either as an emulsion or as a urethane modified asphalt which can be applied by trowel or squeegee. Adjacent sheets of roofing material can be bonded together utilizing lap seams and a separate adhesive or alternately using a lap seam tape. Any method of forming seams between adjoining sheets of roofing membrane can be employed in the present invention.

Thus the present invention combines the benefits and simplicity of an asphalt built-up roof system with the superior strength and durability of an EPDM single ply roof system. Further because the EPDM is shielded from the asphaltic material, it will not be affected by the asphaltic material.

This has been a description of the present invention along with the preferred method of practicing the present invention.

I claim:

1. A roof membrane which is compatible with bituminous adhesives comprising:
   an outer layer membrane selected from the group consisting of EPDM, EPM, TPO, PVC, and CSPE;
   a protecting layer bonded to a surface of said outer layer membrane wherein said protective layer is resistant to bituminous adhesives;
   said protective layer in turn bonded to a fleecy layer.

2. The roof membrane claimed in claim 1 wherein said protective layer is a polar polymeric material.

3. The roof membrane claimed in claim 1 wherein said protective layer is selected from the group consisting of polyester, polyurethane, and polyether.

4. The roof membrane claimed in claim 1 wherein said outer layer membrane is EPDM.

5. The roof membrane claimed in claim 4 wherein said fleecy layer is a non-woven polyester.

6. The roof membrane claimed in claim 1 wherein said outer layer membrane is a thermoplastic olefin.

7. A roof membrane which is compatible with bituminous adhesives comprising:
   an outer layer membrane selected from the group consisting of EPDM, EPM, TPO, PVC and CSPE;
   a protective layer bonded to a surface of said outer membrane wherein said protective layer is resistant to bituminous adhesive;
   a first adhesive layer bonding said outer layer membrane to said protective layer; and
   said protective layer in turn bonded to a fleecy layer.

8. The roof membrane claimed in claim 7 further comprising a second adhesive layer bonding said protective layer to said fleecy layer.

9. The roof membrane claimed in claim 8 wherein said first and second adhesive layers are thermoplastic adhesive layers.

10. A roof structure comprising a roof deck and a roof membrane;
    said roof membrane comprising an outer EPDM layer bonded to a protective layer, said protective layer comprising a polar polymer resistant to bituminous adhesive;
    a fleecy layer bonded to said protective layer wherein said fleecy layer is in turn bonded to said roof deck by a bituminous adhesive layer.

11. The structure claimed in claim 10 wherein said protective layer is a polyester polymeric material and wherein said EPDM is bonded to said protective layer by a thermoplastic adhesive.

* * * * *